INVENTOR.
PAUL RUETSCHI

United States Patent Office 3,085,186
Patented Apr. 9, 1963

3,085,186
SILVER-ZINC BATTERY AND METHOD FOR OBTAINING A SUBSTANTIALLY FLAT VOLTAGE DISCHARGE CURVE
Paul Ruetschi, Yardley, Pa., assignor to The Electric Storage Battery Company, a corporation of New Jersey
Filed Aug. 23, 1961, Ser. No. 133,354
5 Claims. (Cl. 320—13)

The present invention generally relates to electric batteries. More specifically, the present invention is concerned with batteries of the silver-zinc type and to a method for operating the same.

Silver-zinc batteries have gained wide acceptance for many applications because they are characterized by a high power output per unit weight and unit volume. Silver-zinc batteries, however, have the disadvantage that they provide a two-step voltage discharge which results from the fact that the active materials of the silver electrode are both divalent silver oxide (AgO) and monovalent silver oxide ($Ag_2O$). For certain applications this two-step discharge cannot be tolerated and it is accordingly a specific object of the present invention to provide means for eliminating this two-step voltage discharge characteristic.

The electrode potential of divalent silver oxide is 500 millivolts vs. a mercuric oxide reference electrode. The electrode potential of monovalent silver oxide is 200 millivolts vs. a mercuric oxide reference electrode. In order to derive the maximum amount of power from a silver positive electrode such an electrode, at the state of full charge, must consist completely of the divalent oxide. During discharge the divalent oxide is first converted to the monovalent oxide. Theoretically, the electrode potential of divalent silver oxide should be maintained in electrode discharge until all of the divalent oxide present has been discharged to the monovalent state. Only then should the electrode potential drop to the monovalent oxide potential plateau. In practice, however, the divalent oxide plateau is much shorter than that theoretically obtainable. While the mechanism responsible for the shortening of the divalent oxide plateau is not fully understood, it is believed that as the discharge of the silver electrode begins, the divalent oxide in the region of electrical contact with the electrode is reduced to monovalent oxide. The monovalent oxide thus formed, being a much poorer conductor than the divalent oxide tends to isolate the remaining divalent oxide in the electrode from discharge and itself is discharged to silver. This silver, which is an excellent conductor, however, does not make the remaining divalent oxide available for discharge because it chemically combines with the divalent oxide in the presence of the electrolyte to form the monovalent oxide. Thus, the full divalent silver oxide capacity of a silver electrode is seldom achieved on discharge and represents unavailable power.

In the co-pending application of Boris D. Cahan, Serial No. 861,020, filed December 21, 1959, and entitled "Electric Battery," and now Patent No. 3,017,448, which application is assigned to the assignee of the present invention, there is disclosed a method for obtaining substantially 100% of the theoretical discharge voltage plateau available from divalent silver oxide. In accordance with this application, there is added to a silver electrode for alkaline battery application, lead or a compound of lead in an amount from about 0.1% to about 5% by weight of silver in the electrode. In the presence of alkaline electrolytes the silver oxide and the lead or lead compounds react to form a coating on the silver oxide particles of silver plumbate. This silver plumbate is an exceptionally good conductor having a specific resistivity of approximately $3 \times 10^{-3}$ ohm-cm. As a result of its high conductivity and the fact that it is not reduced until after both of the silver oxides are reduced, it is believed that the silver plumbate film described provides a conductive matrix within the electrode which permits the discharge of substantially all of the divalent silver oxide present in the electrode to its monovalent state during the electrode discharge. A completely charged silver electrode containing such a conductive matrix is characterized by discharge capabilities in which the divalent oxide plateau is substantially the same length as the discharge plateau of the monovalent oxide.

It is another object of the present invention to provide a means for obtaining a flat voltage discharge from a plurality of silver-zinc cells operated in series with a minimum power loss. While not limited thereto, the present invention is particularly adapted for use with cells having positive electrodes having a conductive matrix therein as described in the aforementioned co-pending application.

In accordance with the present invention a number of silver-zinc cells are operated in series with one of the cells connected in reverse in an uncharged or partially charged state. During the first plateau of discharge from the cells connected in the forward direction, the positive electrode of the cell connected in reverse will be charged from silver to the monovalent oxide and its voltage subtracted from that of the other cells. At the end of the first plateau of discharge, the reversed cell is reversed and the voltage from this battery is now added to instead of being subtracted from the voltage of the other series connected cells. The number of series connected cells and the number of reverse cells are regulated to provide a battery of cells having a substantially flat voltage discharge characteristic.

A better understanding of the present invention may be had from the following description when read with reference to the accompanying drawing of which:

Figure 1:
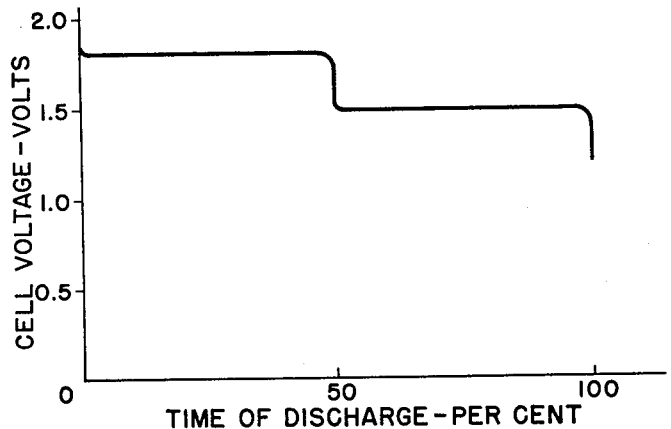
FIG. 1 is a diagram showing the voltage discharge characteristics of a silver-zinc cell.

Referring now to FIG. 1, there is shown the voltage discharge characteristics of a silver zinc cell in a completely charged state, i.e., with the silver electrode consisting almost entirely of divalent silver oxide. The divalent oxide discharge plateau is approximately 1.8 volts and the monovalent oxide discharge plateau is approximately 1.5 volts against zinc. The characteristics of the cell shown are those of a cell having an additive thereto of the type described in the aforementioned co-pending application and, hence, the discharge plateau attributable to the divalent oxide is approximately equal in length to the plateau available in the discharge of the monovalent oxide. As explained hereinafter, however, the present invention is not limited to use with such cells.

Figure 2:
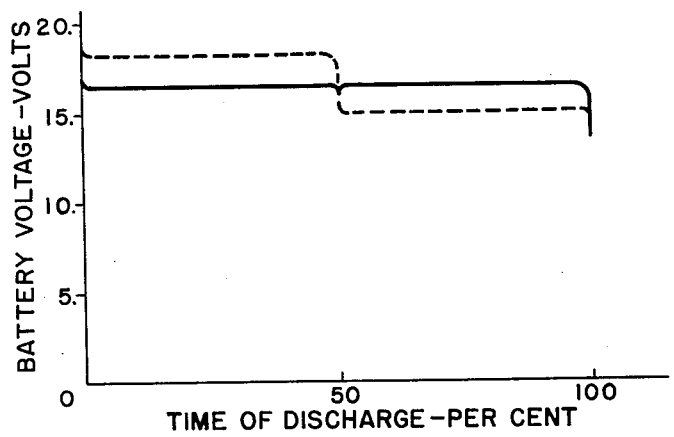
FIG. 2 is a diagram illustrating the voltage discharge characteristics of a battery of cells operated in accordance with the present invention.

Generally, a number of silver-zinc cells are operated in series to produce voltages of between 10 to 20 volts and above. Assuming that X cells are connected in series producing an initial voltage of 1.8 X volts. After half the discharge time the output of these series connected cells drops to 1.5 X volts. To produce a substantially flat discharge from such interconnected cells there is a voltage drop of 0.3 X volts which must be corrected. In accordance with the present invention it is proposed to connect a small number Y of silver-zinc cells reversed to the bank of X cells. These reversed cells are essentially uncharged or have a charged capacity proportioned in a manner described hereinafter. During the first plateau of discharge the positive electrodes of the Y cells will be charged from silver to monovalent silver oxide. The voltage during this first plateau of discharge is then (1) $\quad$ Voltage $= 1.8X - 1.5Y$ Further, in accordance with the present invention the Y cells are now reversed at the end of the first plateau when the voltage of the X cells has dropped to 1.5 volts. The voltage of the Y batteries is now added instead of subtracted to the voltage of the X batteries. During the second plateau the total voltage output from the series connected cells is (2) $\quad$ Voltage $= 1.5X + 1.5Y$ Equating the voltages of Equations 1 and 2 there is obtained the condition for the ratio between the number of forward connected cells X and reversed connected cells Y required in a battery to provide a flat discharge curve as follows (3) $\quad 0.3X = 3.0Y$ or (4) $\quad \dfrac{Y}{X} = \dfrac{1}{10}$ As seen from Equation 4, one cell must be operated in reverse for every 10 cells connected in the forward direction to provide a flat discharge curve. Such a corrected discharge curve is shown in FIG. 2. The uncorrected discharge voltage characteristics shown in FIG. 2 is represented by the dashed line and drops from 18 volts to 15 volts upon the utilization of approximately 50% of the discharge capacity. The discharged characteristics of the battery as corrected in accordance with the present invention remains constant at 16.5 volts as is represented by the solid line. The dip at mid-discharge represents the reversing time for the Y cell which in practice can be made almost instantaneous.

Figure 3:
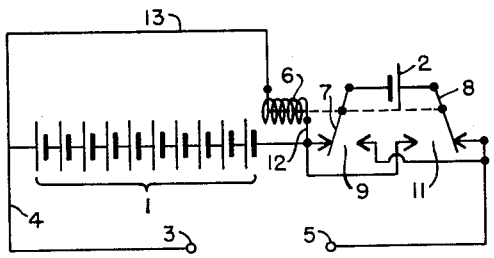
FIG. 3 is a circuit diagram showing the inter-connection of cells in accordance with the present invention.

Referring now to FIG. 3 there is shown a means for operating the cells of a silver-zinc battery in accordance with the present invention to obtain the flat discharge curve shown in FIG. 2. The numeral 1 designates the ten cells connected in the forward direction and the numeral 2 the cell, the output of which is to be reversed. As shown, the positive terminal of the series connected cells 1 is connected to the battery output terminal 3 by means of the conductor 4. The negative terminal of the series connected cells 1 is connected to the other battery output terminal 5 through the reversed cell 2 by means of the contacts of a relay 6. As shown, the relay 6 has a pair of movable contacts 7 and 8, each having associated therewith a pair of stationary contacts, 9 and 11, respectively. The relay coil 6 is connected to be energized by the output of the series connected cells 1 by means of the conductors 12 and 13. As shown, the stationary pairs of contacts 9 and 11 associated with the movable contacts 7 and 8 of the relay 6 are connected to reverse the polarity of the cell 2 upon de-energization of the relay 6. The relay 6 is a voltage sensitive relay of the type adapted in this application for de-energization when the output voltage of the ten series connected batteries 1 fails to the 15-volt monovalent oxide discharge plateau. In this manner there is provided across the battery output terminals 3 and 5 a flat output voltage of 16.5 volts.

The particular advantage of the arrangement shown in FIG. 3 is that no energy is lost when the full output of the divalent silver oxide plateau is utilized. The energy dissipated during the first plateau in charging the cell 2 is added to the output of the battery during the second plateau of the discharge. The only addition to the ten cells is the one uncharged cell originally connected in reverse. When one operates ten batteries utilizing the full divalent oxide content of the silver electrodes together with one uncharged battery connected in reverse, the total energy output per unit weight of the entire assembly is:

(5) $\quad \text{Energy} = \dfrac{16.5 t(i)}{11g} = 1.5 \dfrac{ti}{g}$ where 16.5 is the corrected discharge voltage, $t$ the discharge time, $i$ the discharge current, and $g$ the weight per single cell. If the battery would be operated with an electronic regulating device one could obtain from eleven batteries all in series, the following output per unit weight:

(6) $\quad \text{Energy} = \dfrac{[11(1.8) + 11(1.5)]^{1/2}(i)}{11g} = 1.65 \dfrac{ti}{g}$ Thus, from Equations 5 and 6 it can be seen that an essentially flat discharge curve can be obtained from the eleven batteries connected as shown with a sacrifice of only 9% of the theoretical power output. In this respect it is interesting to note that the power output which could be obtained from all eleven cells operated in series, but only on the monovalent silver oxide plateau, which would provide a flat discharge, yields a power output of:

(7) $\quad \text{Energy} = \dfrac{[11(1.5) + 11(1.5)]^{1/2}(i)}{11g} = 0.75 \dfrac{ti}{g}$ In considering the present invention it should be understood that while it is desirable, it is not necessary that the full divalent silver oxide discharge plateau be available from the silver-zinc cells utilized in order that the system be operable. The incorporation of a conductive matrix as mentioned hereinbefore to make available the full divalent oxide discharge plateau does make it possible to utilize cells having the same capacity. In this respect it should be noted that where the discharge available from the divalent oxide plateau of the series connected cells does not substantially equal the plateau available from the monovalent silver oxide, that the charged capacity of the reversed cell can be proportioned at the outset of operation in such a manner with respect to the divalent oxide plateau discharge available from the series connected cells so that when that cell is connected in reverse it can supply to the output terminals a voltage to compensate for the lack of the higher output voltage for the remainder of the battery discharge. In other words, the reversed cell should be designed to accept a charge during the length of the divalent silver oxide discharge plateau of the ten forward connected cells which will bring its charged capacity to such a value that upon reversal it will provide a discharge for a time equal to that of the monovalent silver oxide discharge plateau of the other ten cells.

Having described the present invention, that which is claimed as new is:

1. A silver-zinc battery comprising, in combination, a plurality of cells connected in series, one cell in every eleven cells being connected in opposition to the other ten cells, said cells exhibiting a discharge characterized by two discreet voltage plateaus, the first of said plateaus being attributable to the divalent silver oxide in the positive electrodes of said cells and the second of said plateaus being attributable to the monovalent silver oxide in the positive electrodes of said cells, and means for reversing the polarity of said one in every eleven cells when the discharge voltage of the other ten cells in every eleven cells drops from said first plateau to said second plateau, the charged capacity of said one in every eleven cells being proportioned with respect to the first discharge plateau available from said ten cells of every eleven that it will be charged sufficiently upon reversal to provide a discharge which will be substantially equal in length to the second plateau discharge from the other ten of said eleven cells to provide a substantially flat voltage discharge from said combination of cells.

2. The battery of claim 1 wherein said batteries are further characterized by voltage discharge plateaus of substantially equal length.

3. A silver-zinc battery comprising, in combination, ten fully charged cells, one uncharged cell, a pair of output terminals, means connecting said cells in series across said output terminals with said one cell connected in opposition to said ten cells, and means responsive to the voltage across said ten cells for reversing the polarity of the connection of said one cell when the output voltage of said ten cells drops from the divalent silver oxide discharge plateau to the monovalent silver oxide discharge plateau.

4. A method of operating silver-zinc cells of the type characterized by two distinct voltage discharge plateaus, the first of said plateaus being attributable to the divalent silver oxide in the positive electrodes of said cells and the second of said plateaus being attributable to the monovalent silver oxide in the positive electrodes of said cells comprising the steps of connecting one cell in every eleven cells in opposition to the other ten cells to charge said one cell until the discharge voltage of the ten cells drops from said first plateau to said second plateau, and reversing the polarity of the connection of said reversed cell at that time to add the output of said one cell to the output of the other ten cells, the charged capacity of said one cell being proportioned with respect to the first discharge plateau available from said ten cells that it will be charged sufficiently upon reversal to provide a discharge which will be substantially equal in length to the length of the second plateau discharge from the other ten cells to provide a substantially flat voltage discharge from said combination of cells.

5. A silver-zinc battery characterized by a substantially flat voltage discharge curve comprising, in combination, a plurality of cells each characterized by two distinct voltage plateaus, the first of said plateaus being attributable to the divalent silver oxide in the positive electrode of said cells and the second of said plateaus being attributable to the monovalent silver oxide in the positive electrode of said cells, said cells being further characterized by voltage plateaus of substantially equal lengths, means for connecting ten of each eleven of said cells in series and one of each eleven cells in opposition to said ten cells, said ten cells being fully charged and said reversed cell being uncharged, and means for reversing the polarity of said reversed cell when the voltage of the other ten cells of each of said eleven drops from the first plateau.

No references cited.